United States Patent [19]

Inoue

[11] Patent Number: 5,062,492

[45] Date of Patent: Nov. 5, 1991

[54] ELECTRONIC WEIGHING SCALE

[75] Inventor: Shinichi Inoue, Tarumiki, Japan

[73] Assignee: Yamato Scale Company, Limited, Akashi, Japan

[21] Appl. No.: 480,843

[22] Filed: Feb. 16, 1990

[30] Foreign Application Priority Data

Feb. 18, 1989 [JP] Japan .................................. 1-38727

[51] Int. Cl.$^5$ ...................... G01G 19/40; G01G 23/10
[52] U.S. Cl. .................................. 177/25.14; 177/185
[58] Field of Search ............................. 177/185, 25.14

[56] References Cited

U.S. PATENT DOCUMENTS 4,037,095 7/1977 Howells et al. .
4,817,026 3/1989 Inoue et al. ..................... 364/724.01
4,825,965 5/1989 Inoue et al. ..................... 177/185 X Primary Examiner—George H. Miller, Jr.

[57] ABSTRACT

An electronic weighing scale is adapted to determine the weight of an object. A weight signal is generated having a direct current component indicative of the weight of the object and a superposed periodic oscillatory component. The period $T_1$ of the periodic oscillatory component of the weight signal is determined. The weight signal is sampled at sampling intervals $T_2$, having a relationship to period $T_1$ defined by:

$$nT_1 = NT_2; \text{ and}$$

$$N \geq 2n$$

where n and N are positive integers, n being the number of cycles of the periodic oscillatory component during which the samples takes place, and N being the number of samples taken. The samples of the weight signal are averaged and the weight of the object is determined based on the averaged samples.

28 Claims, 7 Drawing Sheets

ELECTRONIC WEIGHING SCALE

BACKGROUND OF THE INVENTION

The present invention relates to electronic weighing scales of the type generating an electric signal ("weight signal") which comprises a direct current component ("DC-component") indicative of the weight and a periodic oscillatory signal component superposed on the DC-component due to vibration and inherent in the electronic weighing scale.

The weight signal produced by a weighing mechanism including a load cell or other elastic structure comprises a DC-component indicative of the true weight of product weighed and a periodic oscillatory signal component caused by loading shock and vibrations in the elastic structure. In the case of a hanging scale or crane scale adapted to weigh the product which is directly or indirectly hung on the scale, the hung product is apt to oscillate also causing a periodic oscillatory signal component to be superposed on the DC-component indicating the true weight.

Analog filters or non-recursive filters composed of a multiplier, an adder, and a delay circuit have been used to remove the periodic oscillatory signal component from weight signals. However, if these filters are used to completely remove the periodic oscillatory signal component the response time of the weight signal indicating the weight is slowed because of the remarkably low frequency of the periodic oscillatory signal component.

SUMMARY OF THE INVENTION

It is therefore among the objects of this invention to provide an electronic weighing scale free from the above-described disadvantage, and in particular, to provide such an electronic weighing scale that substantially eliminates periodic oscillatory signal components from a weight signal and which has a quick response time without any significant delay in the DC-component indicating the weight.

The electronic weighing scale of this invention produces samples of weight signals each composed of a DC-component mixed with a periodic oscillatory component inherent in the vibration in the scale, and determines the weight of the product by averaging sampled data. Generally, the weighing scale comprises:

(a) means for determining the period $T_1$ of the periodic oscillatory components of the weight signal;
(b) means for sampling the weight signal at sampling intervals $T_2$ having a relationship to the period $T_1$ of the periodic oscillatory components, given by:

$$nT_1 = NT_2$$

$$N \geq 2n$$

where "n" and "N" are positive integers, "n" is the number of cycles of the periodic oscillatory component during which the sampling takes place, and "N" is the number of samples taken; and
(c) means for averaging the sequential weight signal samples.

Figure 1:
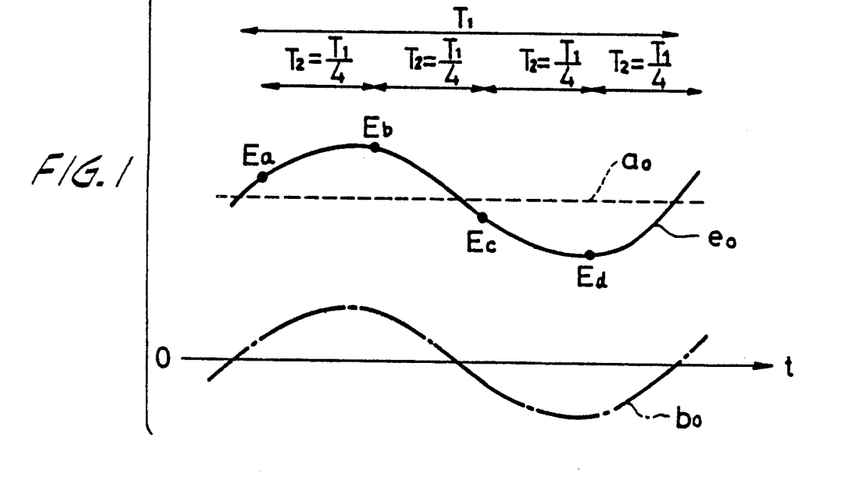
FIG. 1 is a graph of a waveform illustrating the principles of the electronic weighing scale of this invention.

The operation of the above-described electronic weighing scale will now be explained referring to FIG. 1 in which a periodic oscillatory component $b_o$ is superposed on a DC-component $a_o$ to produce a weight signal $e_o$. Assuming n=1 and N=4, the sampling interval $T_2$ is given as $\frac{1}{4}$ of the length of the period $T_1$ of the periodic oscillatory component. In a case where four consecutive weight signal samples are averaged (i.e. N=4), then those four samples are, for example, picked up at four points $E_a$, $E_b$, $E_c$ and $E_d$ at any initial phase angle on the graph in FIG. 1. In an average of those four sampled signals, the periodic oscillatory components will cancel each other due to their sinusoidal nature, thereby giving a pure DC-component which corresponds to the true weight.

It will now be apparent that the scale of this invention is effective in almost completely eliminating periodic oscillatory components due to vibration from the weight signal. Delays in response time of the DC-component are minimized, giving the scale a good response characteristic. The scale is effective in removing the oscillatory components even where their frequency varies within a frequency range in the course of time.

BRIEF DESCRIPTION OF THE DRAWINGS

The present invention will become more apparent from the detailed description and the accompanying drawings, wherein:

FIGS. 3 to 8 illustrate a first embodiment of an electronic weighing scale constructed according to the principles of this invention, in which:

FIGS. 9a to 11 illustrate a second embodiment of the invention, in which:

DETAILED DESCRIPTION OF PREFERRED EMBODIMENTS

The preferred embodiments of an electronic weighing scale in accordance with this invention will now be described in detail, referring to the drawings.

Figure 2:
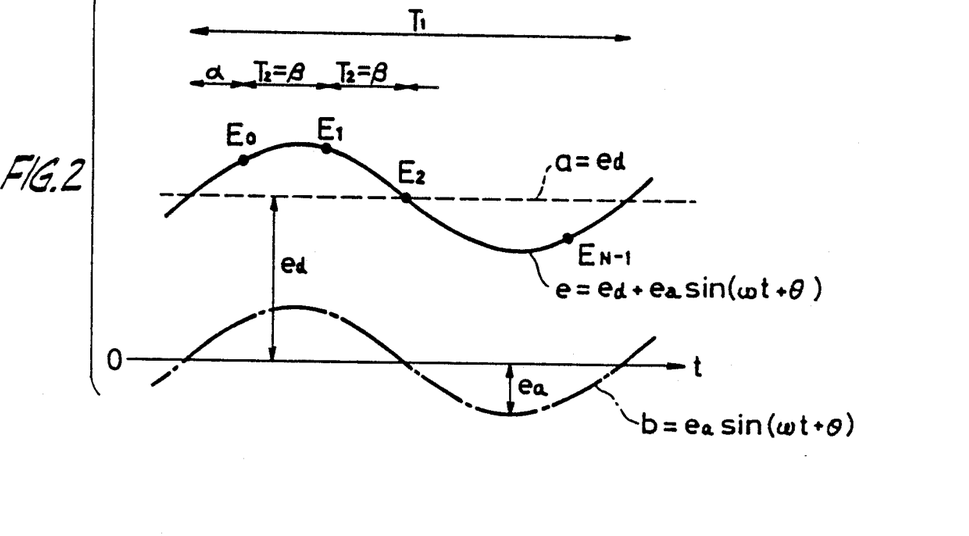
FIG. 2 is another graph of a waveform illustrating the principles of the electronic weighing scale of this invention.

The principle is explained at first with reference to FIG. 2 and using some mathematical equations.

As shown in FIG. 2, it is assumed that a periodic oscillatory component b inherent in a vibration system is superposed on a DC-component a indicative of the true weight of the product to thereby produce a weight signal e. The DC-component a and the oscillatory component b are given by the following equations:

$$a = e_d$$

$$b = e_a \sin(\omega t + \theta)$$

Consequently, the weight signal e may be expressed by the following general formula:

$$\begin{aligned} e &= a + b \\ &= e_d + e_a \sin(\omega t + \theta) \end{aligned}$$

where $\omega$ is the angular velocity (radians/sec), $\theta$ is the phase angle (radians), $e_d$ and $e_a$ are amplitudes, and t is time.

The period $T_1$ of the periodic oscillatory component b is expressed as follows:

$$T_1 = 1/f$$

$$f = \omega/2\pi$$

Each weight signal sample $E_i$ (i=0 to N−1) which is obtained by sampling the weight signal e based on an initial phase angle $\alpha$ and at a sampling interval $T_2$, i.e., at a phase angle interval of $\beta$ (radians), will be given by the following equations:

$$\begin{aligned} E_0 &= e_d + e_a \sin \alpha \\ E_1 &= e_d + e_a \sin(\beta + \alpha) \\ E_2 &= e_d + e_a \sin(2\beta + \alpha) \\ &\cdots \\ E_{N-1} &= e_d + e_a \sin((N - 1)\beta + \alpha) \end{aligned}$$

An average value $E_m$ of the number N of weight signal samples $E_i$ (i=0 to N−1) is given by:

$$\begin{aligned} E_m &= 1/N \cdot \sum_{i=0}^{N-1} E_i \quad (1) \\ &= e_d + 1/N \cdot e_a (\sin \alpha + \sin(\beta + \alpha) + \sin(2\beta + \alpha) + \\ &\quad \ldots + \sin((N - 1)\beta + \alpha)) \\ &= e_d + 1/N \cdot e_a \sin(\alpha + (N - 1)\beta/2) \cdot \\ &\quad \sin(N/2)\beta \div \sin \beta/2 \end{aligned}$$

Assuming that the second term on the right side of equation (1) equals zero, then the equation (1) becomes "$E_m = e_d$". This means that the effect of periodic oscillatory component b is excluded from this equation so that the average $E_m$ depends only upon the DC-component a.

In order that the second term in the right side of equation (1) equals zero regardless of the value of initial phase angle $\alpha$, this equation must be satisfied:

$$\sin(N/2)\beta \div \sin \beta/2 = 0 \quad (2)$$

Furthermore, the "sampling theorem" of this invention requires the sampling to be done at a frequency (i.e., $1/T_2$) which is twice or more the repeating frequency f (i.e., $1/T_1$) of the periodic oscillatory component contained in the weight signal. In other words, the sampling must be made at the repeating intervals $T_2$ (i.e., $\beta$) and at least twice within each period $T_1$ (i.e., $2\pi$) of the periodic oscillatory component. Thus the following equation also must be satisfied:

$$2\beta \leq 2\pi$$

This condition ensures that the denominator in the equation (2) does not equal zero, resulting in:

$$\sin(N/2)\beta = 0; \text{ and therefore}$$
$$(N/2)\beta = \pi, 2\pi, 3\pi \ldots$$

This result and the above-mentioned condition (i.e., $2\beta \leq 2\pi$) gives the following values of phase angle:

$$\beta = 2\pi/N, 4\pi/N, 6\pi/N \ldots \leq \pi$$

It will now be apparent that $N \geq 2$ must be satisfied when the average is taken from the samples $E_i$ taken within one cycle (i.e., $2\pi$) of the periodic oscillatory component b repeating at the interval $T_1$; that $N \geq 4$ must be satisfied when the average is taken from the samples $E_i$ taken during two cycles (i.e., $4\pi$) of said oscillatory component; and that $N \geq 6$ must be satisfied when said average is taken from the samples $E_i$ which are sampled during three cycles (i.e., $6\pi$) of said component, wherein N is an integer.

It will be apparent from the above description that the general relationship between the sampling intervals $T_2$ ($\beta$) for samples $E_i$ and the interval $T_1$ of the periodic oscillatory components b, is given by:

$$nT_1 = NT_2$$

$$N \geq 2n$$

where n and N are positive integers, n is the number of cycles of the periodic oscillatory component during which the sampling takes place, and N is the number of samples taken.

Next, details are described which are pertinent to determination of the average value of the samples $E_i$ of the weight signals e.

FIRST EMBODIMENT

As described in this embodiment, the weighing apparatus is adapted to take N samples $E_i$ during each period $T_1$ of said periodic oscillatory component b.

Figure 3:
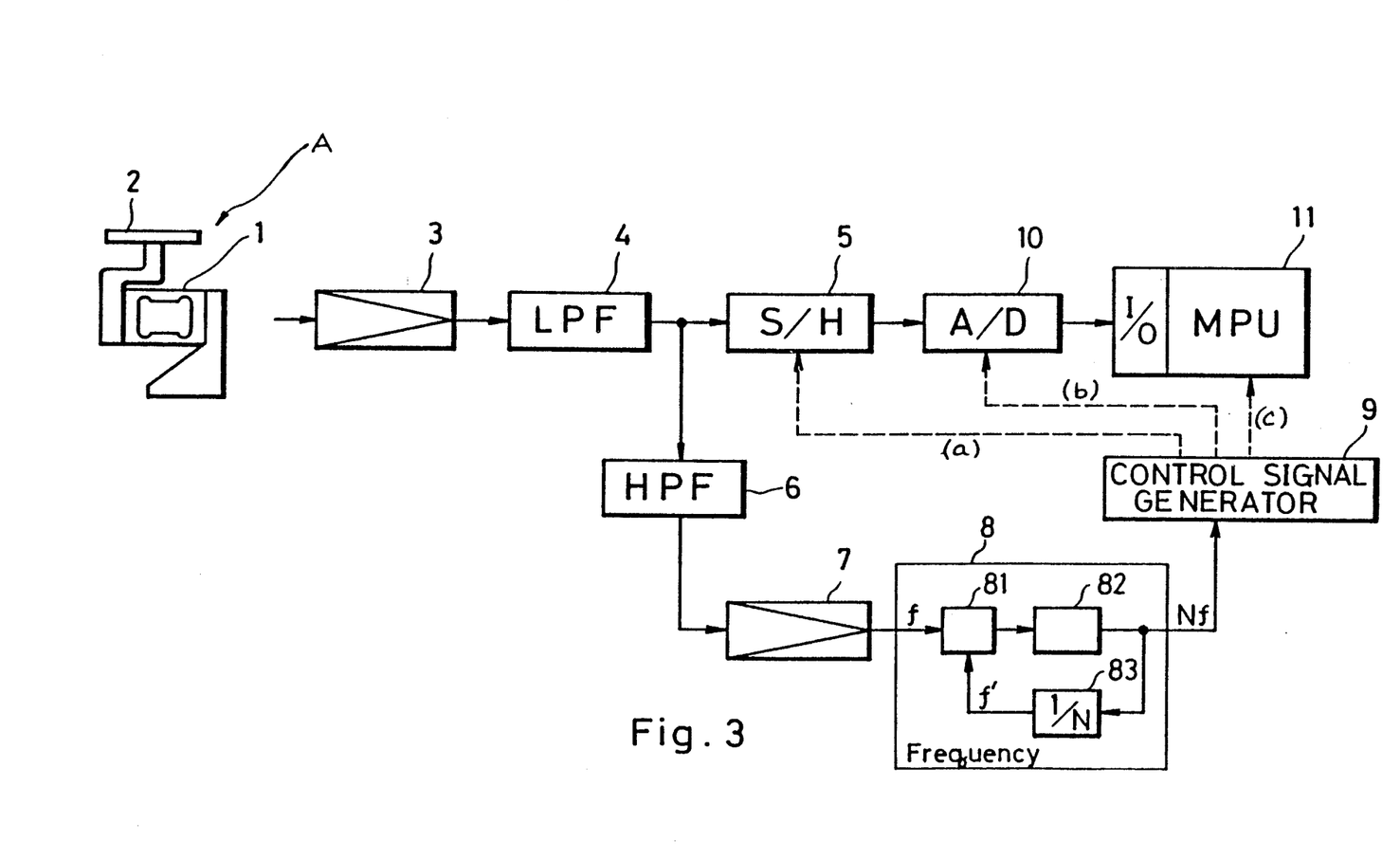
FIG. 3 is a block diagram showing parts of an electronic weighing scale according to the first embodiment.

FIG. 3 shows a weighing mechanism comprising a parallelogramic structure A, which is an elastic structure of the type having load cells 1 attached to its elastic fulcrums, each load cell comprising a strain gauge. The parallelogramic structure A supports with its upper portion a weighing platform or pan 2 on which an object or product to be weighed is loaded. The object or product causes the parallelogramic structure to reversibly deform responsive to a weight of the object or product. The extent of the deformation is detected by means of the output signal from the load cells 1. In other words, the load cells 1 output a weight signal e which contains a DC-component a corresponding to a true weight of said object.

Figure 4:
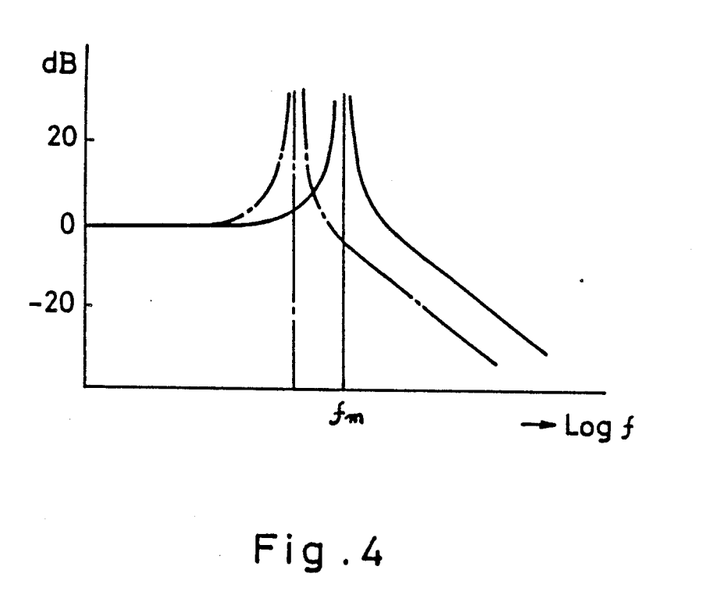
FIG. 4 is a resonance characteristic curve of a parallelogramic device employed in the first embodiment.

The parallelogramic structure A forms a vibration system similar to a spring-mass system encountered in the vibration engineering. This vibration system has an "eigenvalue" as to its resonance characteristic, as shown in FIG. 4. The resonance frequency or natural frequency $f_m$ which is produced when the object is loaded on the weighing platform 2 of the parallelogramic structure a is given by the following equation:

$$f_m = \frac{1}{2\pi} \sqrt{\frac{K \cdot g}{m_0 + m}} \quad (3)$$

where K is a spring constant, g is the acceleration value of gravity, $m_0$ is a tare weight, and m is a net weight of the object to be weighed.

The resonance frequency $f_m$ will shift from a position indicated by the solid line for a weightless state (m=0) into another position indicated by the broken line as shown in FIG. 4 when a weight is placed on the scale (m>0). Such a resonance oscillation in conjunction with an impact force imparted to the weighing platform 2 by placing the object thereon gives rise to the periodic oscillatory component b, which is superposed on the DC-component a to thereby produce such a composite weight signal e.

It is noted here that a value of m in the right side of equation (3) determines the resonance frequency $f_m$. Thus, the value of $f_m$ remains unknown so far as the value of weight $f_m$ is unknown. This makes it impossible for a notch filter of a known constant frequency to always filter out the oscillatory component in an optimal manner. The dependence of the value $f_m$ upon the weight of object has made filtering the weight signal very difficult.

As shown in FIG. 3, in the first embodiment of this invention, the weight signal e generated by the load cells 1 and including the oscillatory component b is amplified by an amplifier 3 and is fed to a low-pass filter 4 which has an attenuation characteristic sufficient to eliminate higher frequencies. Consequently, only lower frequency components comprising the DC-component a and the oscillatory component b pass the low-pass filter 4. The thus-filtered weight signal e is then input to a sample-and-hold circuit 5 adapted to take measurements or samples of input signals at a predetermined times. The filtered weight signal e is also is fed to a high-pass filter 6 composed of a C-R network or an active high-pass filter.

Figure 5:
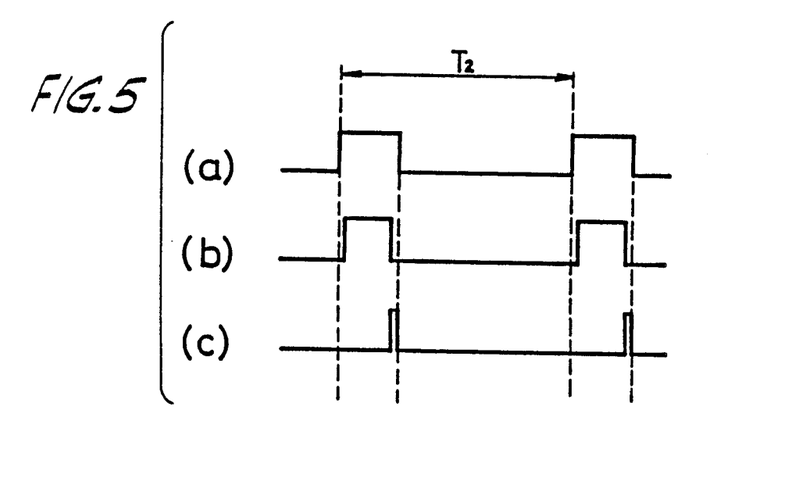
FIG. 5 is a time chart showing clock pulse waveforms.

The high-pass filter 6 filters out the DC-component a indicative of the weight of weighed object from the weight signal e, leaving only the oscillatory component b. This periodic oscillatory component b passing said high-pass filter is supplied via amplifier 7 to a frequency synthesizer 8 consisting of a phase-locked loop (PLL). The frequency synthesizer 8 comprises a phase comparator 81, a voltage-controlled oscillator 82 and a frequency divider 83 having a dividing ratio N. The frequency synthesizer 8 feeds a reference signal, having a frequency Nf which is synchronized with such a value that is N (an integer "2" or higher) times as much as the frequency f of the oscillatory component b, to a control signal generator. In the frequency synthesizer 8, the reference signal of the frequency Nf generated in the voltage-controlled oscillator 82 is fed to the frequency divider 83, which divider generates a feed back clock signal f' and outputs same into the phase comparator 81. This phase comparator 81 detects the phase difference between the frequency f of said oscillatory component b and the feed back clock signal f' from said oscillator 82, and generates an output signal that is a voltage dependent on the phase difference. The comparator 81 then feeds the thus-produced output signal to the voltage-controlled oscillator 82. The reference signal of the frequency Nf is utilized in the control signal generator 9 to generate clock pulse signals (a), (b), and (c) as shown in FIG. 5. Each of these signals consists of clock pulses repeating at such regular time intervals $T_2 (=1/Nf)$ that are 1/N (N≧2) times the repetition interval $T_1 (=1/f)$ of said oscillatory component b.

The weight signals e, which as described above, are delivered to the sample-and-hold circuit 5 by the low-pass filter 4 are analog signals each comprising the periodic oscillatory component b superposed on the DC-component a indicative of the weight of weighed object. The analog values of the signals are sequentially measured one by one in said sample-and-hold circuit 5 at a timing as given by clock pulse signal (a) in FIG. 5. Subsequently, the thus-measured analog values are sequentially converted into digital values in an analog-to-digital (A/D) converter 10 at another timing as given by the clock pulse signal (b) in FIG. 5, and then are output from said converter. The digital values $D_i$ sequentially output as the samples $E_i$ are supplied to a microprocessor 11 via an interface, the microprocessor being controlled by clock signals (c) as indicated in FIG. 5. The microprocessor 11 executes a predetermined processing every time it receives a new digital value $D_i$ forming a series of digital values in such a manner that a predetermined number N of those digital values $D_1$ to $D_{i-N+1}$ including the new one $D_i$ and the preceding "N−1" digital values are averaged to give a progressive average $_1M_i$ by means of the following equation:

$$_1M_i = \frac{D_i + D_{i-1} + \ldots + D_{i-N+1}}{N} \quad (4)$$

This progressive average $_1M_i$ is the weight of weighed object.

It is to be noted that in the first embodiment the progressive average is obtained based on N digital values (N=2 or higher integer) as the sampled values $E_i$ which are included in one period $T_1$ (i.e., $2\pi$) of periodic oscillatory component b. However, it may be possible to pick up N digital values (N=4 or a higher integer) within two periods $2T_1$ (i.e., $4\pi$), or to pick up N digital values N=6 or a higher integer) within three periods $3T_1$ (i.e., $6\pi$) of said oscillatory component, as said samples $E_i$. In these two latter cases, the progressive average may be calculated with a ½-frequency divider or a ⅓-frequency divider, respectively, interposed between the frequency synthesizer 8 and the control signal generator 9 so as to obtain a desired number of the digital values $D_i$ for the samples $E_i$. Thus, the frequency ratio of the sampling interval to the frequency of the oscillatory component becomes N/n.

Although the progressive average is described in the first embodiment, a simple or one-time average may be useful if the successive change in the weight signals in the course of time need not be checked. Alternatively, the progressive average may be calculated every time when two or more number K of new digital values $D_{i+1}, \ldots D_{j+K}$ are received by the microprocessor, but based on the same number K of said successive values $D_{j+K}$ back to $D_{j+K+1-N}$ including said new values $D_{i+1} \ldots D_{j+K}$.

In the first embodiment described above, the microprocessor 11 produces a series of progressive averages. According to a first modification of the first embodiment a predetermined number of such progressive averages which follow one after another to form a series thereof are processed again by the microprocessor 11 so that double or second order progressive averages are produced.

Equation (4) also sequentially gives the simple or first order progressive averages $_1M_i$, $_1M_{i-1}$, ... Here utilized are successive $N_2$ values thereof $_1M_i$, $_1M_{i-1}$, $_1M_{i-N_2+1}$ in order to calculate the double progressive average $_2M_i$ based on the following equation:

$$_2M_i = \frac{_1M_i + {_1M_{i-1}} + \ldots + {_1M_{i-N_2+1}}}{N_2}$$

This progressive average $_2M_i$ is the weight of weighed object.

Figure 6:
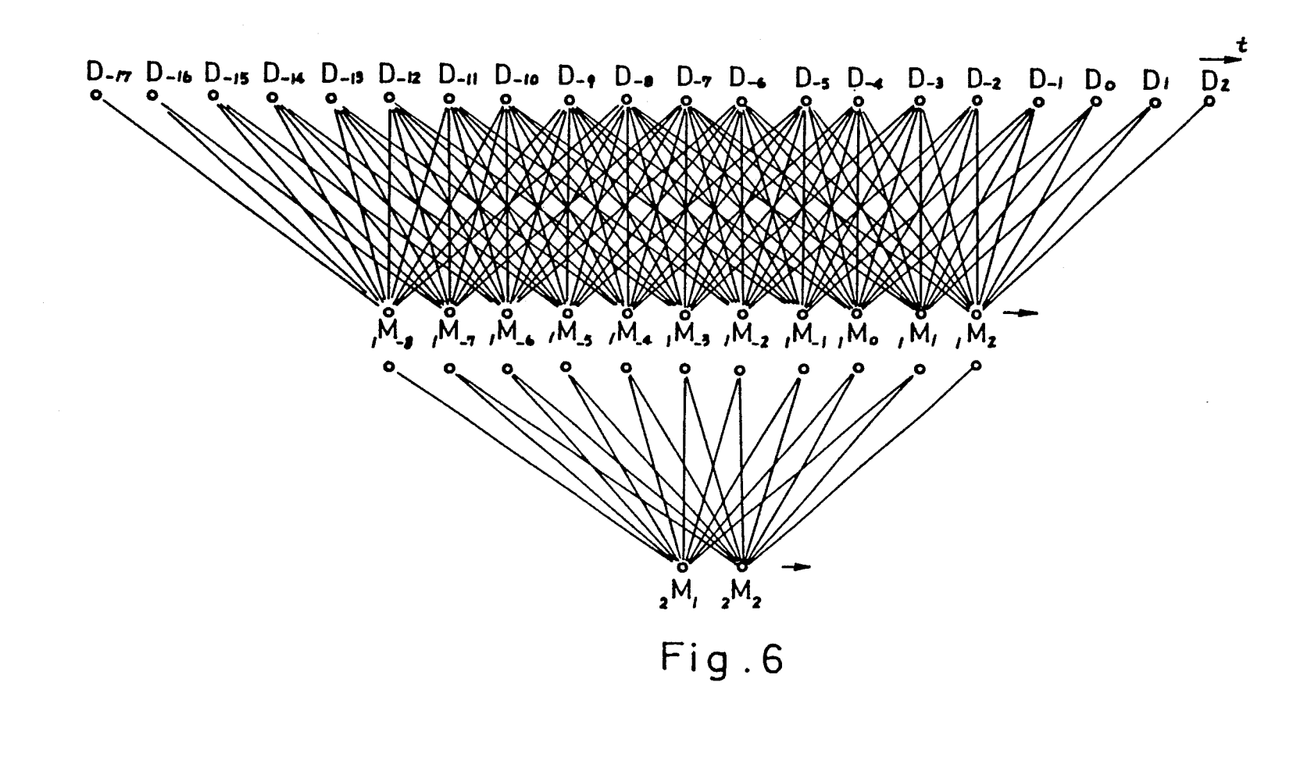
FIG. 6 is a schematic view of the progressive averaging process.

The determination of a double progressive average is shown schematically in FIG. 6 for the case where $N_1 = 10$, and $N_2 = 10$.

The number $N_1$ for the simple or first order progressive averages is preferably the same as the number $N_2$ for the double or second order progressive averages. However, these numbers may be different integers whose values are close. for example $N_1 = 10$ and $N_2 = 11$.

There are some dynamic loading cases or some transient cases in which a large weight is loaded on the weighing scale instantaneously within a very minute fraction of a second, for instance, in a few 100 milliseconds, or a loaded weight increase or decreases in the course of time during the weighing operation. The second order progressive averages are very useful in these cases because they improve the poor attenuation characteristic which may be observed in the first order progressive averages, even though some frequency deviation occurs between the frequency f of oscillatory component b and the feed back clock frequency f' from the frequency divider 83 in said synthesizer 8.

There may be employed, in place of the double progressive averaging method, the so-called transfer function method which is a kind of calculation method mathematically equivalent to said progressive averaging.

In this case, a first progressive average with the number $N_1 = 10$ may be expressed by means of the pulse transfer function as follows:

$$G_1 = \frac{1 + Z^{-1} + Z^{-2} + \ldots + Z^{-9}}{10} \quad (5)$$

Further, a second progressive average with $N_2 = 10$ may be expressed according to said transfer function as follows:

$$G_2 = \frac{1 + Z^{-1} + Z^{-2} + \ldots + Z^{-9}}{10} \quad (6)$$

A double or second order transfer function will be given by the following equation using the first and second progressive averages mentioned above:

$$\begin{aligned} G &= G_1 \cdot G_2 \quad (7) \\ &= 1/100 \, [1 + 2Z^{-1} + 3Z^{-2} + 4Z^{-3} + 5Z^{-4} + 6Z^{-5} + 7Z^{-6} + \\ &\quad 8Z^{-7} + 9Z^{-8} + 10Z^{-9} + 9Z^{-10} + 8Z^{-11} + 7Z^{-12} + 6Z^{-13} + \\ &\quad 5Z^{-14} + 4Z^{-15} + 3Z^{-16} + 2Z^{-17} + Z^{-18}] \end{aligned}$$

Figure 7:
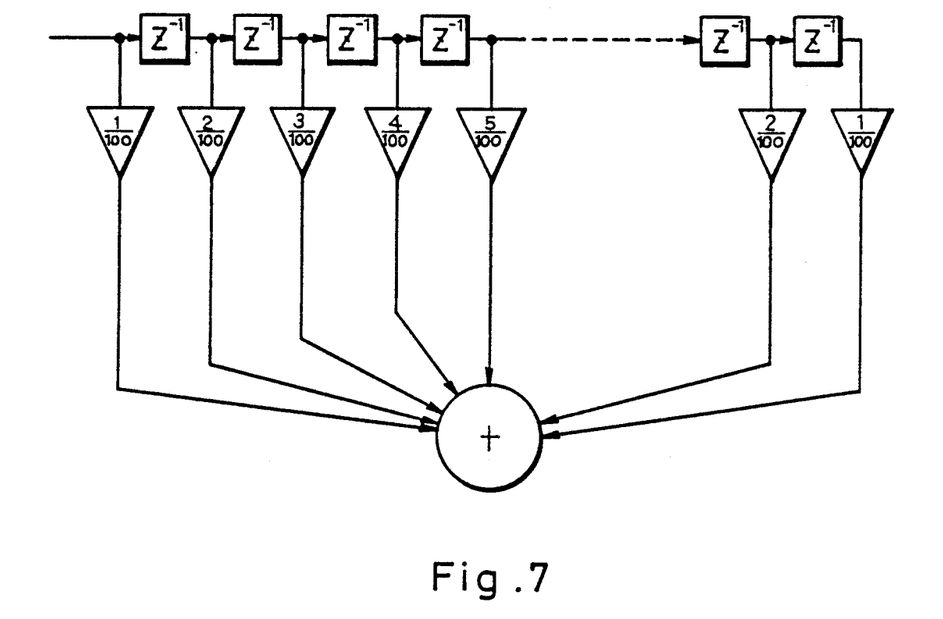
FIG. 7 is a schematic view of a circuit system for determining progressive averages based on the transfer function method according to a first modification of the first embodiment.

This equation, which is called an 18th order pulse transfer function, may be embodied with a finite impulse response (FIR)-digital filter which comprises: 18 delay circuits denoted by "$Z^{-1}$" in FIG. 7 and corresponding to a time length for each sampling; 19 multiplication constants to which the values 1/100, 2/100, 3/100, 4/100 ... (i.e., coefficients for "$Z^{-k}$" in the transfer function of equation (7)) are respectively given; and an adder. The 18th order transfer function referred to above is in practice calculated by executing multiplication and adding processings in the micro-processor. Further, the equation (7) makes it clear that the double progressive averaging can also be performed by a method of "weighted averaging" in which the nineteen digital values of the input weight signals including the newest one $D_i$ and the successively preceding digital values $D_{i-1}, D_{i-2}, D_{i-18}$ are respectively multiplied by the weighting coefficients such as 1/100, 2/100, 3/100 and so on. Processings for triple or third order progressive averages may also be carried out by an FIR digital filter. Reference is made here to a copending United States patent application No. 07/336,213 filed Apr. 14, 1989, incorporated herein by reference for the details of such an FIR filter.

The frequency ratio N/n of the sampling signals from the control signal generator 9 to the frequency of the periodic oscillatory component will now be described for a case wherein the double, triple or higher multiplex progressive averages, or the transfer function "G" equivalent thereto is employed. At first, calculation of the equation (7) giving the transfer function "G" is broken up into two fundamental calculations of the values $G_1$ and $G_2$ which are factors of the function "G" and respectively given by equations (5) and (6). $G_1$ is the first progressive average, and $G_2$ is the second progressive average. The number $N_1$ or $N_2$ of data for calculation of said elemental values $G_1$ or $G_2$ is to be substituted for the value N. Therefore, $N=10$ for the ratio N/n in the example mentioned above.

Figure 11:
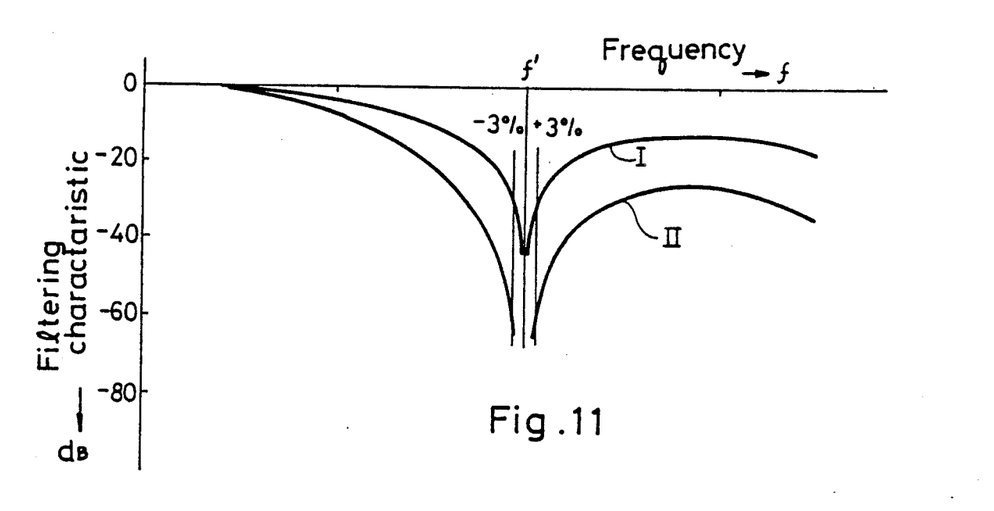
FIG. 11 is a graph showing the filtering characteristics of progressive averaging and a double progressive averaging according to this invention.

FIG. 11 shows a filtering characteristic curve I in a case where the simple or first order progressive averages are employed with the number $N_1 = 10$ for each average. FIG. 11 also shows another filtering characteristic curve II in another case employing double or second order progressive averages with $N_1 = 10$ and with $N_2 = 10$, or the transfer function given by the equation (7) and equivalent to said double progressive averages.

If the frequency f' of signals from the frequency synthesizer is consistent with the frequency f, the curves I and II take at a point of $f=f'$ a filtering characteristic value of $-\infty$ dB. If, however, f' is less than f by 3%, the filtering characteristic takes a value of $-31.69$ dB on the curve I, and a value of $-63.38$ dB on the curve II. To the contrary, in a case wherein f' is higher than f by 3%, the filtering characteristic takes the value of $-32.11$ dB on the curve I and the value of $-64.22$ dB on the curve II. This shows why a better attenuation ratio is afforded by the double progressive averages of the transfer function equivalent thereto even if a considerable error occurs with respect to the tracking of said periodic oscillatory component frequency by means of said other frequency of the signals from frequency synthesizer.

A second modification of the first embodiment relates to elimination of a surge signal component which is likely to be contained in the weight signal e output from the high-pass filter 6. The surge signal component is of transient nature and is basically caused by the transfer characteristic of low-pass filter 4 and brings about saturation of the amplifier 7, which in turn disturbs the synchronization in function of the frequency synthesizer 8.

Figure 8:
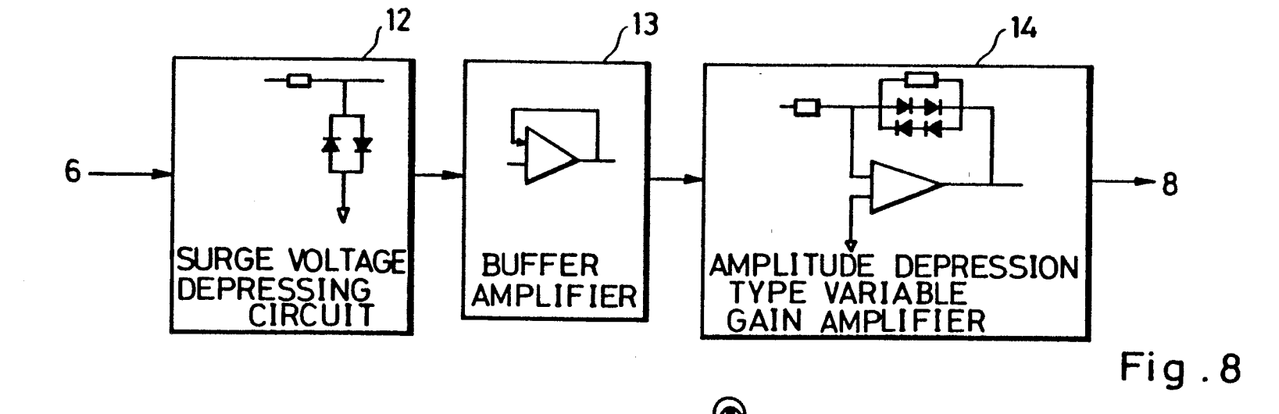
FIG. 8 is a schematic view of a second modification of first embodiment.

The amplifier 7 between the high-pass filter 6 and the frequency synthesizer 8 in the first embodiment is replaced by the circuits or devices shown in FIG. 8.

(1) Surge Voltage-Depressing Circuit 12

If an intense surge signal is input into the high-pass filter, a load circuit portion thereof will impart a positive or negative additional intensity to signal amplitude. Therefore, this circuit is so constructed as to divert the greater part of an excessive current to diodes in an electric shunt so that the additional intensity of signal amplitude can be suppressed. In particular, dynamic resistance of the diodes is lowered with increasing current therethrough whereby an output signal from this circuit is advantageously suppressed. As a result, a transient portion of the DC-component which is output from the high-pass filter is decreased, and at the same time, the change in amplitude of the periodic oscillatory component also is depressed.

(2) Buffer Amplifier 13

This amplifier is interposed between the surge voltage-depressing circuit 12 and a variable-gain amplifier 14 of amplitude-depression type in order that the former circuit may not be affected by a change in load impedance of the latter amplifier.

(3) Amplitude-Depression Type Variable-Gain Amplifier 14:

This further amplifier is in the nature of a nonlinear amplifier in its characteristic. In detail, it produces a sufficient gain even in case of a weaker input signal whereas the gain decreases with increasing intensity of the input signal.

It will be apparent from the above description that the surge voltage-depressing circuit 12, the buffer amplifier 13 and the amplitude-depression type variable-gain amplifier 14 cooperate one another to eliminate the surge signal component which essentially results from the transfer characteristic of the low-pass filter 5. Furthermore, the periodic oscillatory component b which has passed the high-pass filter 6 to be filtered thereby and is occasionally weak in its intensity can be amplified to a sufficient degree whereby the frequency synthesizer 8 receives said oscillatory component b of an adequate intensity. The frequency synthesizer thus performs its synchronizing function in a stable manner. Any deviation or disturbance in synchronization is prevented in all the possible load conditions so that calculation of the averages and the progressive averages is carried out in a completely synchronized state.

It will be understood that analog devices may be incorporated to conduct direct computation of analog data, although the microprocessor 11 in the first embodiment executes computation using digital data.

Figure 9A:
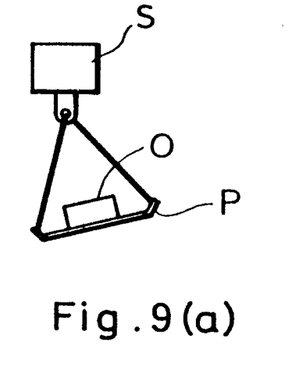
FIG. 9a is a schematic view of a hanging scale.
Figure 9B:
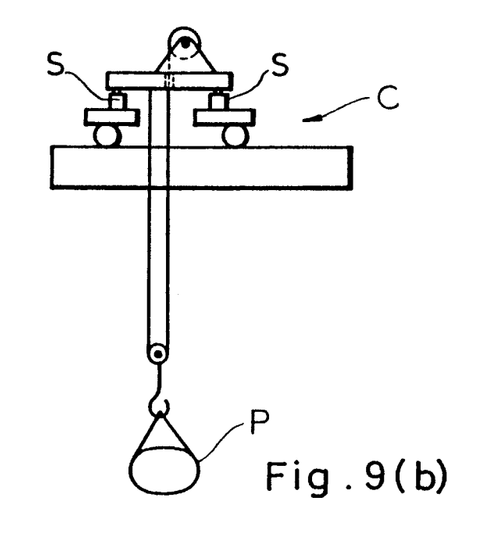
FIG. 9b is a schematic view of a crane scale.

The second embodiment of the invention is adapted for use in a hanging scale as shown in FIG. 9(a) or to a crane scale as shown in FIG. 9(b). FIG. 9(a) illustrates a hanging scale comprising a weighing pan P which depends from a weighing mechanism S. An object O to be weighed is loaded on the pan P. FIG. 9(b) illustrates the crane scale C which has a plurality of weighing mechanisms "S" disposed on supporting parts of a movable crane body. The crane scale comprises, at its lowermost portion, a weighing pan P supported by a hook so that an object that is loaded in the pan is hung.

In hanging scales and crane scales, the weighed object is likely to make a kind of pendulum-like oscillatory motion when it is put on the pan and weighed. In this way, the object itself forms a vibration system wherein a periodic oscillatory component is superposed to or admixed with the DC-component of the weight signals indicating the weight of said object.

An oscillation angle $\theta$ relative to a vertical plane including an oscillation fulcrum is given by the following equations:

$$\theta = \theta_m \sin \gamma t$$

$$\gamma = 2\pi f_p \qquad (8)$$

wherein $\theta_m$ is a maximum angle (radians) of oscillation, $\gamma$ is angular speed (radians/sec), $f_p$ is a frequency of oscillation and t is time.

Assuming that the weight of the hung object and the tare weight equal m, the downward force F caused by the oscillation per se will be expressed by the following equation:

$$F = m \cdot g \cdot \theta_m^{2 \cdot \cos 2\gamma t} \qquad (9)$$

Figure 10A:
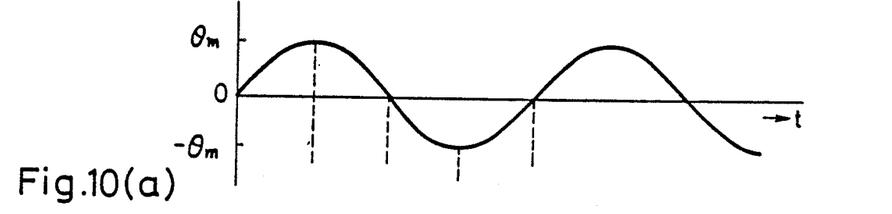
FIG. 10a is a graph showing the periodic oscillatory movement encountered in hanging and crane scales.
Figure 10B:
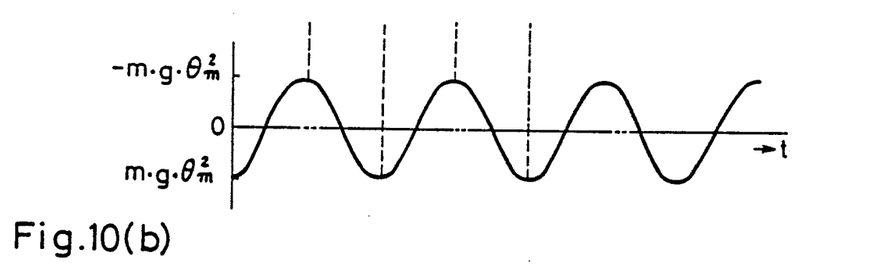
FIG. 10b is a graph showing the periodic oscillatory component of a weight signal generated by a hanging or crane scale.

The oscillation angle will change in the course of time t as shown in FIG. 10(a), while the downward force F changes as shown in FIG. 10(b) in the course of time t.

As indicated in FIG. 10(b), the force F has its maximum downward intensity at an instant when the mass m takes its position just under the oscillation fulcrum, while a maximum upward force appears at the other instants when said mass m has just swung up to either upper dead points. The frequency of the above-mentioned force F is twice the value of oscillation frequency $f_p$.

Thus, the force F produces a periodic oscillatory component of the weight signals, the frequency of the force F corresponding to the repetition frequency f in the first embodiment. The frequency of periodic oscillatory component in the first embodiment may be replaced with such a value as being twice the value of oscillation frequency $f_p$, and an appropriate circuit may be realized and incorporated to detect said periodic oscillatory component included in the weight signal by means of the high-pass filter 6.

What is claimed is:

1. An electronic weighing scale which is adapted to determine the weight of an object, the electronic weighing scale comprising:

means for generating a weight signal having a direct current component indicative of the weight of the object and a superposed periodic oscillatory component having a period $T_1$ which is an arithmetic function of the weight of the object;

means for determining the period $T_1$ of the periodic oscillatory component of the weight signal;

means for sampling the weight signal at sampling intervals $T_2$, having a relationship to period $T_1$ defined by:

$$nT_1 = NT_2; \text{ and}$$

$$N \geq 2n$$

where n and N are positive integers, n being the number of cycles of the periodic oscillatory component during which the sampling takes place, and N being the number of samples taken;

means for averaging the samples of the weight signal; and means for determining the weight of the object based on the averaged samples.

2. The electronic weighing scale according to claim 1 wherein the means for averaging calculates a progressive average for selected samples of the weight signal, each progressive average based on a predetermined number of samples including the selected sample.

3. The electronic weighing scale according to claim 2 wherein the means for averaging includes means for calculating a progressive average based on a predetermined number N of samples including the latest sample, each time one or more new samples is obtained.

4. The electronic weighing scale of claim 2 wherein said means for averaging the samples of the weight signal further includes means for calculating L−1 successive sets of progressive averages, each progressive average of an $i^{th}$ set based on a predetermined number $N_i$ of progressive averages from the $i-1^{th}$ set, L being a preselected integer greater than or equal to 3, and i being any integer from 2 to L.

5. The electronic weighing scale according to claim 4 wherein each of the predetermined numbers $N_i$ is near or equal to N.

6. The electronic weighing scale according to claim 4 wherein the $i^{th}$ progressive average including the first progressive average is adapted to produce in the course of time a series of processed averages as the further progressive averages, using the progressive averages previously obtained in the $i-1^{th}$ progressive average or the selected samples previously obtained from the weight signal.

7. The electronic weighing scale according to claim 4 wherein the progressive averages are weighted averages that are produced by the averaging means by utilizing a series of weighting coefficients means.

8. The electronic weighing scale of claim 1 wherein said means for averaging the samples of the weight signal includes:
(i) means for calculating a first progressive average for selected samples of the weight signal, each first progressive average based on a predetermined number $N_1$ of samples including the new selected sample; and
(ii) means for calculating a second progressive average for selected first progressive averages, each second progressive average based on a predetermined number $N_2$ of first progressive averages including the new calculated first progressive average, $N_1$ and $N_2$ being near or equal to N.

9. The electronic weighing scale according to claim 8 wherein the $i^{th}$ progressive average including the first progressive average is adapted to produce in the course of time a series of processed averages as the further progressive averages, using the progressive averages previously obtained in the $i-1^{th}$ progressive average or the selected samples previously obtained from the weight signal.

10. The electronic weighing scale according to claim 8 wherein the progressive averages are weighted averages that are produced by the averaging means by utilizing a series of weighting coefficients means.

11. The electronic weighing scale of claim 1 wherein said means for averaging the samples of the weight signal includes:
(i) means for calculating a first set of progressive averages, each progressive average based on a predetermined number $N_1$ of samples of the weight signal;
(ii) means for calculating L−1 successive sets of progressive averages, each progressive average of an $i^{th}$ set based on a predetermined number $N_i$ of progressive averages from the $i-1^{th}$ set, L being a preselected integer greater than or equal to 2, and i being any integer from 2 to L.

12. The electronic weighing scale according to claim 11 wherein N equals one of the numbers $N_1$ to $N_L$.

13. The electronic weighing scale according to claim 1 wherein the means for generating the weight signal includes a parallelogram structure supporting the object.

14. The electronic weighing scale according to claim 1 wherein said means for averaging calculates progressive averages according to a transfer function.

15. The electronic weighing scale of claim 1 wherein the generating means includes means for generating a signal within a preset range corresponding to the periodic oscillatory component.

16. An electronic weighing scale which is adapted to determine the weight of an object, the electronic weighing scale comprising:

means for generating samples of a direct current component of a weight signal indicative of the weight of the object, the weight signal having a superposed periodic oscillatory component having a period $T_1$ which is an arithmetic function of the weight of the object;

means for determining the period $T_1$ of the periodic oscillatory component of the weight signal;

means for generating clock pulses at time intervals $T_2$, having a relationship to a period $T_1$ defined by:

$$nT_1 = NT_2; \text{ and}$$

$$N \geq 2n$$

where n and N are positive integers, n being the number of cycles of the periodic oscillatory component during which the sampling takes place, and N being the number of samples taken; and means for converting analog values of the samples of the weight signal into digital values thereof, in correspondence with the clock pulses generated by the generating means; and digital computing means for averaging a predetermined number N of the digital values which are output from the converting means, thereby producing averages which determine the weight of the object.

17. The electronic weighing scale according to claim 16 wherein the averages are progressive averages calculated for selected digital values of the samples based on a predetermined number N of digital values including the selected digital value.

18. The electronic weighing scale according to claim 16 wherein the means for generating the weight signal includes a parallelogram structure supporting the object.

19. The electronic weighing scale of claim 16 wherein the generating means includes means for generating a signal within a preset range corresponding to the periodic oscillatory component.

20. An electronic weighing scale which is adapted to determine the weight of an object, the electronic weighing scale comprising:

means for generating samples of a direct current component of a weight signal indicative of the weight, the weight signal having a superposed periodic oscillatory component having a period $T_1$ which is an arithmetic function of the weight of the object;

means for determining the period $T_1$ of the periodic oscillatory component of the weight signal;

means for generating clock pulses at time intervals $T_2$, having a relationship to a period $T_1$ defined by:

$nT_1 = NT_2$; and $N \geq 2n$ where n and N are positive integers, n is the number of cycles of the periodic oscillatory component during which the sampling takes place, and N is the number of samples taken; and means for converting analog values of the samples of the weight signal into digital values thereof, in correspondence with the clock pulses generated by the generating means; and digital computing means adapted to execute:
(i) a first averaging processing in which progressive averages are each calculated for selected samples, using a predetermined number $N_1$ of digitized samples, including the selected digitized sample; and
(ii) L further averaging processings, including at least a second averaging processing in which further progressive averages are each calculated using a predetermined number $N_i$ of the progressive averages which have been successively obtained by an $(i-1)^{th}$ averaging processing, including the first averaging processing, to calculate a series of progressive averages whereby the $L^{th}$ progressive averages are utilized to determine the weight, wherein N equals one of the numbers $N_1$ to $N_i$, $N_i$ being the number of progressive averages used in the $i^{th}$ averaging processing.

21. The electronic weighing scale according to claim 20 wherein a further progressive average is calculated by the digital computing means in the $i^{th}$ averaging processing for each new progressive average obtained in the $i-1^{th}$ averaging processing, using a predetermined number $N_i$ of progressive averages from the $i-1^{th}$ averaging processing, including the new progressive average.

22. The electronic weighing scale according to claim 20 wherein the $i^{th}$ averaging processing by the digital computing means produces, in the course of time, a series of processed averages that are further progressive averages of the progressive averages successively obtained in the $i-1^{th}$ averaging processing.

23. The electronic weighing scale according to claim 22 wherein the processed averages are such weighted averages that are produced by the averaging means by utilizing a series of weighting coefficients means, and wherein in all of the first to the last averaging processings including the $i^{th}$ averaging processing, N equals $N_1$ or one of the numbers to $N_i$, which are the number of the progressive averages used in the $i^{th}$ averaging processing.

24. The electronic weighing scale according to claim 20 wherein the first to the last averaging processings including the $i^{th}$ averaging processing by the digital computing means are conducted at the same time according to a transfer function.

25. The electronic weighing scale of claim 20 wherein the generating means includes means for generating a signal within a preset range corresponding to the periodic oscillatory component.

26. An electronic weighing scale which is adapted to generate digital signals based on an analog weight signal of an object, the weight signal being composed of a direct current component indicative of the weight and a periodic oscillatory component superimposed on the direct current component, the electronic weighting scale comprising:

filtering means for selectively extracting the periodic oscillatory component from the weight signal;

signal processing means for generating a signal within a preset range corresponding to the periodic oscillatory component of the weight signal extracted from the weight signal;

generating means for generating clock pulses at a frequency $f_2$, which is at a predetermined ratio with respect to the frequency $f_1$ of the corresponding signal generated by the signal processing means; and converting means for converting values of the analog weight signal into digital values thereof, in correspondence with the clock pulses generated by the generating means.

27. The electronic weighing scale of claim 26 wherein the signal processing means includes a circuit effecting surge voltage supression of the periodic oscillatory component extracted from the weight signal.

28. The electronic weighting scale of claim 26 wherein the signal processing means includes an amplifier outputting a gain decreased in response to an increase in amplitude of the periodic oscillatory component extracted from the weight signal.

* * * * *